US007606588B2

(12) United States Patent
Griffin

(10) Patent No.: US 7,606,588 B2
(45) Date of Patent: Oct. 20, 2009

(54) HIERARCHICAL POINT-TO-MULTIPOINT GROUP COMMUNICATIONS BETWEEN MULTIPLE ACTIVE COMMUNICATION GROUPS

(75) Inventor: Jeffrey Jason Griffin, Raleigh, NC (US)

(73) Assignee: Telefonaktiebolaget LM Ericsson (publ), Lund (SE)

( * ) Notice: Subject to any disclaimer, the term of this patent is extended or adjusted under 35 U.S.C. 154(b) by 510 days.

(21) Appl. No.: 11/470,298

(22) Filed: Sep. 6, 2006

(65) Prior Publication Data

US 2008/0057992 A1    Mar. 6, 2008

Related U.S. Application Data

(60) Provisional application No. 60/824,132, filed on Aug. 31, 2006.

(51) Int. Cl.
*H04B 7/00* (2006.01)
(52) U.S. Cl. ...................... 455/518; 455/11.1
(58) Field of Classification Search ............. 455/518, 455/519, 7, 13.1, 11.1
See application file for complete search history.

(56) References Cited

U.S. PATENT DOCUMENTS 7,333,826 B2 * 2/2008 Siegel ..................... 455/518

FOREIGN PATENT DOCUMENTS

WO    WO2006026937    3/2006

OTHER PUBLICATIONS

OMA Open Mobile Alliance, http://www.openmobilealliance.org/release_program/poc-v1_0.html.
Haartsen J, "Die Bluetooth-übertragung" Funkschau, Weka Fachzeitschriften Verlag, Poing, De, vol. 72, No. 15, Jul. 9, 1999 pp. 76-80 XP000913229.
Sewook Jung et al: "Decentralized Optimization of Dynamic Bluetooth Scaternets" Mobile and Ubiquitous Systems: Networking and Services, 2005. Mobiquitous 2005. The Second Annual International Conference, Jul. 17, 2005 XP10854006A.
International Search Report, International Application No. PCT/US2007/065403, Mailed: Oct. 24, 2007.

* cited by examiner

*Primary Examiner*—Tu X Nguyen
(74) *Attorney, Agent, or Firm*—Coats & Bennett, P.L.L.C.

(57) ABSTRACT

A method and apparatus for facilitating group communications across multiple groups of wireless communication devices is described herein. A first wireless communication device is joined to a first group of wireless communication devices, and a second wireless communication device is joined to the first group and to a second group of wireless communication devices. When the first wireless communication device sets a retransmit indicator in a group message transmitted to the second wireless communication device, the second wireless communication device automatically retransmits the received group message to other wireless communication devices in the second group.

15 Claims, 6 Drawing Sheets

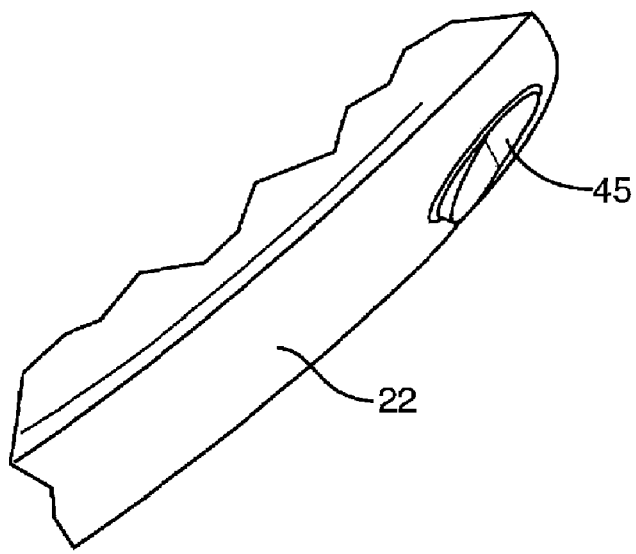
FIG. 4A
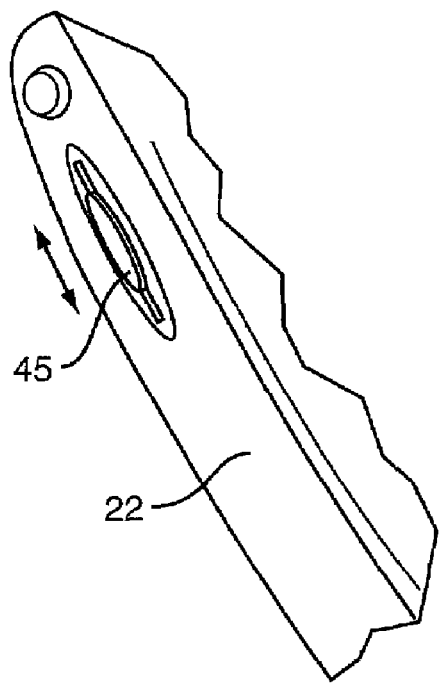 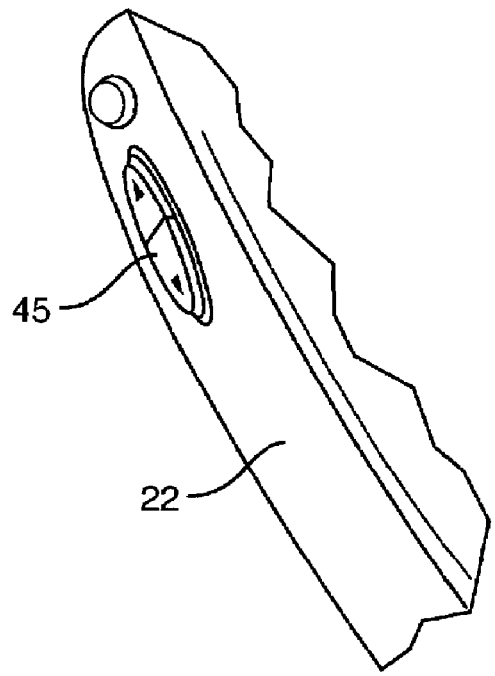
FIG. 4B          FIG. 4C

HIERARCHICAL POINT-TO-MULTIPOINT GROUP COMMUNICATIONS BETWEEN MULTIPLE ACTIVE COMMUNICATION GROUPS

RELATED APPLICATION

This application claims the benefit of U.S. Provisional Patent Application 60/824,132 filed on Aug. 31, 2006, which is incorporated herein by reference.

BACKGROUND

This invention relates generally to group communications between wireless communication devices, and more particularly to point-to-multipoint group communications between wireless communication devices joined to different communication groups.

Due to the pervasiveness of cellular telephones and other wireless communication devices, manufacturers and service providers continue to explore features and/or services that distinguish their products from their competitor's products. Push-to-talk services represent one particularly popular wireless service.

Push-to-talk services provide point-to-multipoint communications that directly connect two or more wireless communication devices joined to a common communication group. At the push of a push-to-talk control or button, a user of a wireless communication device in a group may communicate with all other devices in the group. This enables near instant communication between group members.

While conventional push-to-talk services have several advantages over conventional cellular telephone communications, there are some disadvantages. For example, conventional push-to-talk services restrict communications to members of a single group. As such, members of one group cannot directly communicate with members of another group. Therefore, there remains a need for improved push-to-talk communications.

SUMMARY

The present invention provides a method and apparatus that facilitates group communications across multiple groups of wireless communication devices. According to one exemplary embodiment, a first wireless communication device is joined to a first group of wireless communication devices, and a second wireless communication device is joined to the first group and to a second group of wireless communication devices. When the first wireless communication device sets a retransmit indicator in a group message transmitted to the second wireless communication device, the second wireless communication device automatically retransmits the received group message to other wireless communication devices in the second group. As a result, a member of one group may quickly and directly address members of multiple other groups without having to create a separate all-encompassing group.

BRIEF DESCRIPTION OF THE DRAWINGS

FIGS. 4A-4C show exemplary controls for implementing the present invention.

DETAILED DESCRIPTION

Figure 1:
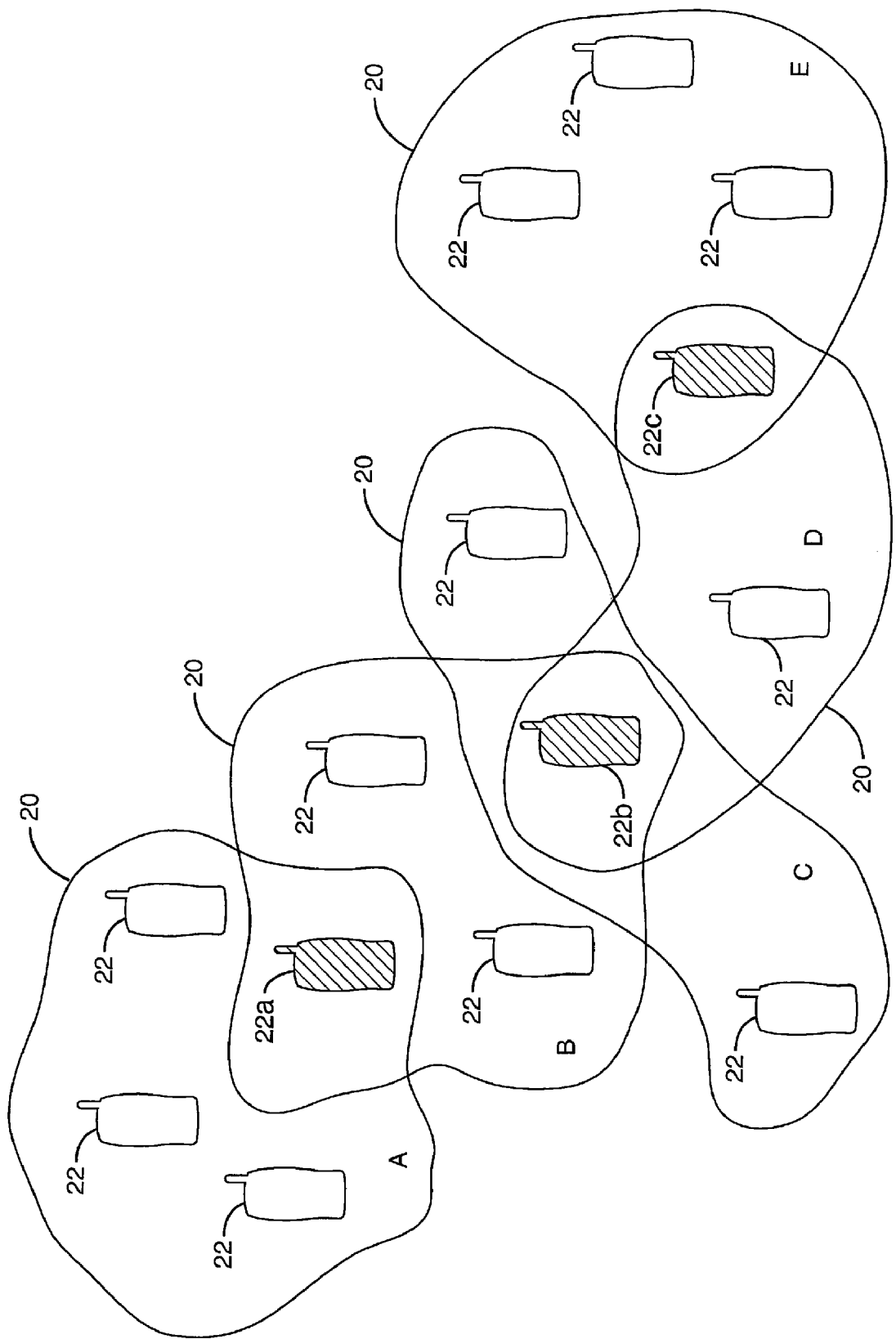
FIG. 1 shows multiple groups of a wireless network.

FIG. 1 shows a wireless network that comprises multiple groups 20 of wireless communication devices, collectively referred to herein with reference number 22. The devices 22 in each group 20 participate in point-to-multipoint group communications. One device 22 may communicate with other devices 22 within the same group 20 by transmitting a group message to the other devices 22 according to any known group communication standard, such as Push-to-talk over Cellular (PoC). For simplicity, FIG. 1 omits the details associated with any particular point-to-multipoint communication network.

Currently, a wireless communication device 22 can only be a member of one active group 20 at a time. However, the advent of one exemplary group communication standard, OMA (Open Mobile Alliance) PoC 2.0, will enable one wireless communication device 22 to simultaneously be a member of multiple active groups 20. For example, as shown in FIG. 1, wireless communication device 22a, which is a member of group A and group B, may transmit/receive group messages to/from any device 22 of group A and any device 22 of group B. However, conventional standards do not allow a device 22 only in group A to directly communicate with a device 22 only in group B.

The present invention solves this problem using a wireless communication device 22 joined to two or more groups 20 to automatically retransmit a received group message when the received group message contains a retransmit indicator. As a result, devices 22 joined to multiple groups 20 enable direct communication between members of different groups 20. In the figures, these retransmit devices are highlighted with a shading pattern.

Figure 2:
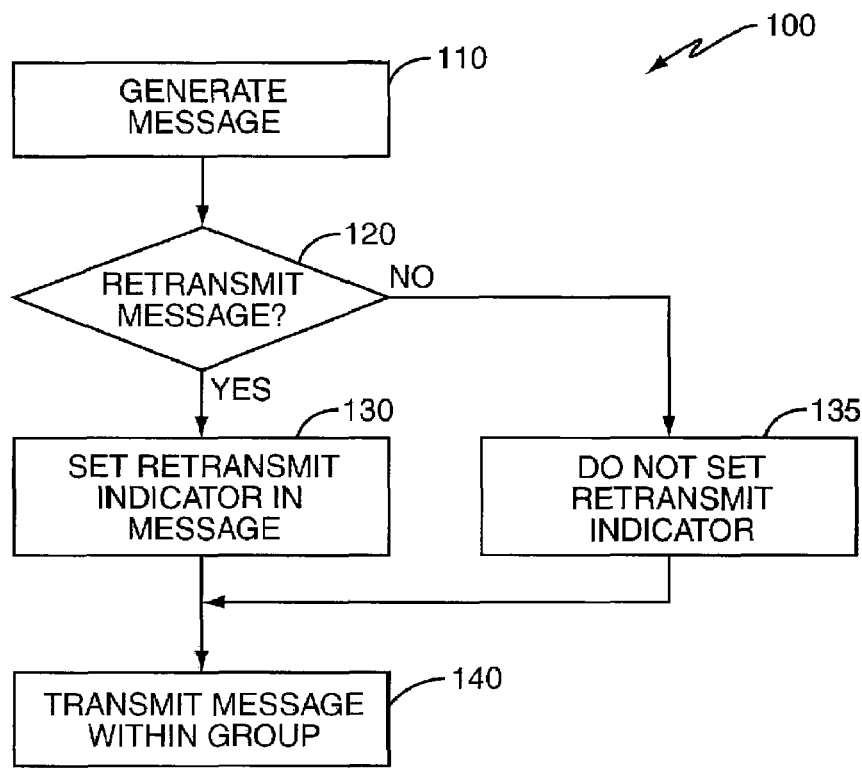
FIG. 2 shows a process diagram for group communications according to the present invention.

FIG. 2 shows a process diagram illustrating one exemplary procedure 100 of the present invention from the perspective of an originating device 22 that generates a group message. The user of an originating device 22 generates a group message for transmission to devices in a selected group (block 110). If the user wants the group message to be retransmitted to devices 22 in other groups 20, the user designates the message as a retransmit message (block 120). In response to this designation, the originating device 22 sets a retransmit indicator in the message (block 130). If the user does not want the group message to be retransmitted to devices in other groups 20 (block 120), originating device 22 does not set the retransmit indicator (block 135). Originating device 22 transmits the group message to the devices in the same group 20 as the originating device 22.

Figure 3:
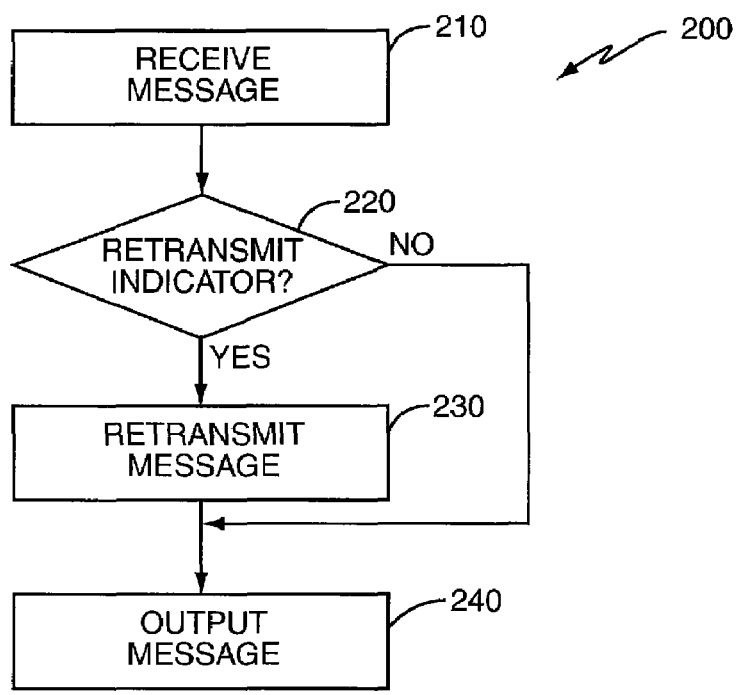
FIG. 3 shows another process diagram for group communications according to the present invention.

FIG. 3 shows a process diagram that illustrates an exemplary retransmitting procedure 200 from the perspective of a retransmitting device 22 that is joined to two or more groups 20, one of which includes the originating device 22. When a retransmitting device 22 receives the group message (block 210), retransmitting device 22 analyzes the received message to see if the retransmit indicator is set (block 220). If the retransmit indicator is set, retransmitting device 22 automatically retransmits the group message to devices 22 in the other group (block 230). Further, retransmitting device 22 will output the received message to an output element of the device 22 by, for example, outputting the received message to a speaker, display, etc. (block 240). If the retransmit indicator is not set, retransmitting device 22 still outputs the message to an output element (block 240), but does not retransmit the message.

As shown in both FIGS. 2 and 3, the exemplary processes 100, 200 use a retransmit indicator to indicate whether or not the group message should be automatically retransmitted. The retransmit indicator comprises one or more bits that indicate to a multi-group device 22 whether or not a message received from a device 22 in one group 20 should be automatically retransmitted to devices 22 in another group. In general, the originating device 22 controls the retransmit indicator based on user input. For example, the originating device 22 may set the retransmit indicator by changing the retransmit indicator bit to "1." The user may provide the input using any known means, including but not limited to, control buttons, displayed menu items, voice commands, etc. For example, device 22 may include a rocker switch 45 as shown in FIG. 4A. When rocker switch 45 is pushed upward while the user speaks into a microphone of device 22, the resulting group message is designated as a retransmit group message. Alternatively, when rocker switch 45 is pushed downward while the user speaks into the microphone, the resulting message is not designated as a retransmit group message. Other exemplary controls include but are not limited to slide switches 45 (FIG. 4B) and double button controls 45 (FIG. 4C).

Figure 5:
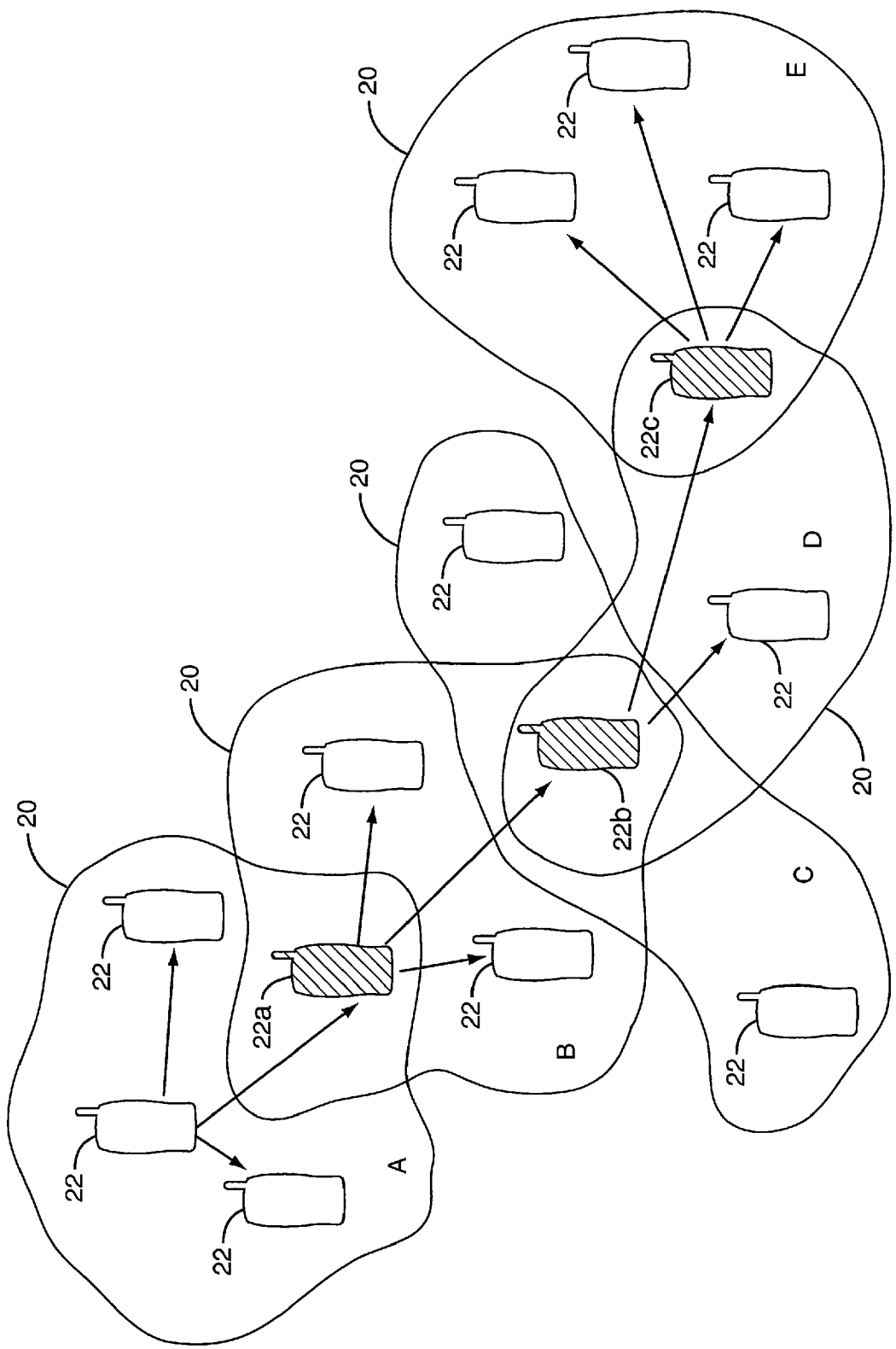
FIG. 5 shows the operation of the present invention within the wireless network.

FIG. 5 illustrates an example of a hierarchical group communication as implemented by the present invention. Originating device 22 in group A generates a group message as discussed above. To transmit the message to all other devices 22 in groups A-E, originating device 22 transmits the group message to the devices 22 in group A, including device 22a. When the retransmit indicator is set, device 22a automatically retransmits the received group message to all devices 22 in group B, including device 22b. This process repeats for the remaining groups until all devices 22 in groups A-E receive the message generated by the originating device 22. As a result, the users of the devices 22 in groups A-E directly receive the message generated by the user of the originating device 22 in group A.

Figure 6:
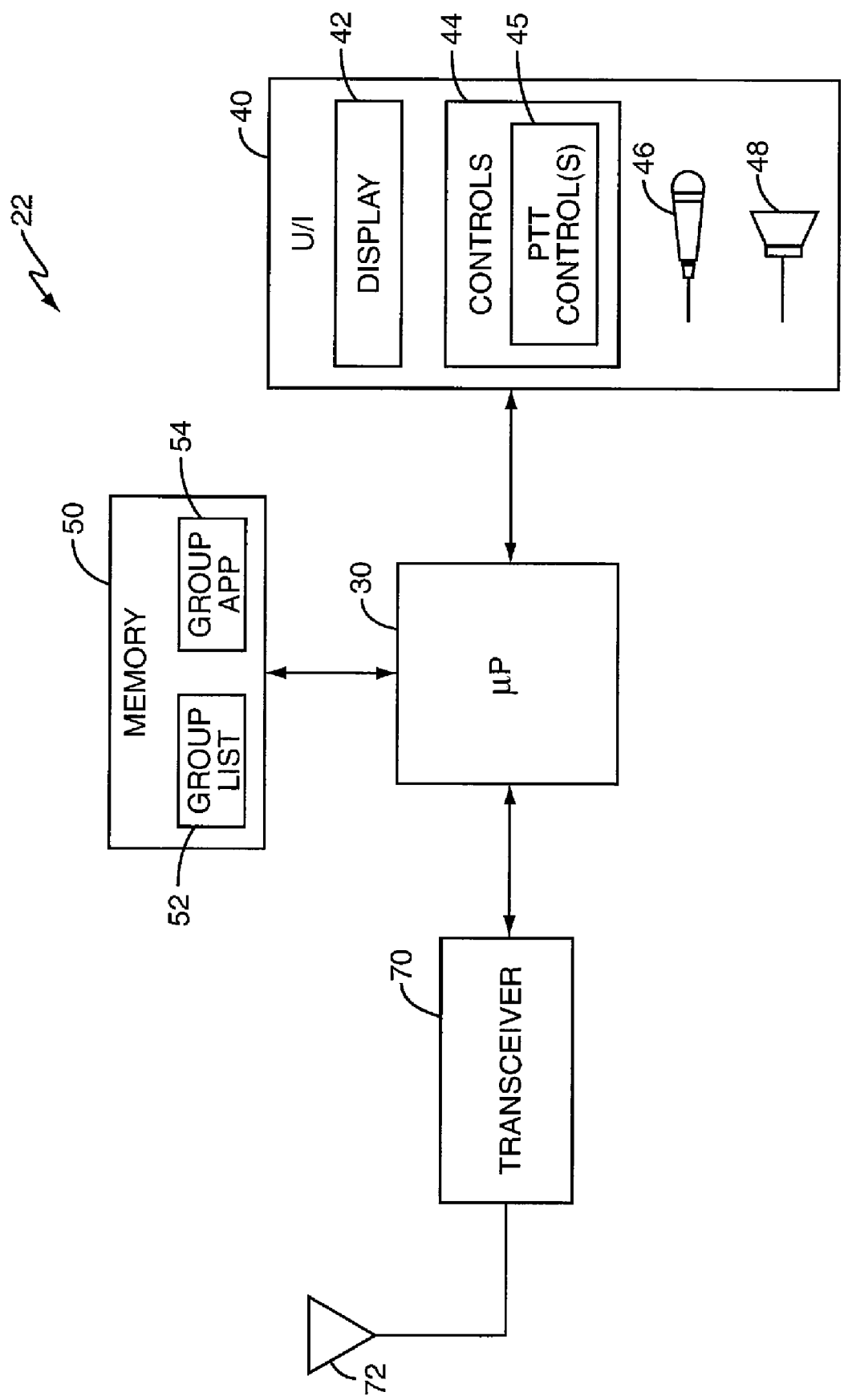
FIG. 6 shows a block diagram of one exemplary wireless communication device of the present invention.

FIG. 6 shows a block diagram of an exemplary wireless communication device 22 that may be used to implement the above-described processes. As used herein, the term "wireless communication device" includes a cellular telephone, personal data assistant, laptop computer, or any other communication device that includes a wireless transceiver. Wireless communication device 22 includes a user interface 40, memory 50, processor 60, and transceiver 70. User interface 40 display 42, one or more input controls 44, including at least one push-to-talk control 45, a microphone 46, and a speaker 48 that enable the user to interact with the wireless communication device 22. Processor 60 performs various processing tasks, including control of the overall operation of mobile device 22, according to programs stored in memory 50, which stores data and programs needed for operation. Transceiver 70 transmits and receives wireless signals via antenna 72. The transceiver 70 may operate according to any known standard. Exemplary communication standards include but are not limited to, Code Division Multiple Access (CDMA), Global System for Mobile Communications (GSM), Universal Mobile Telecommunications System (UMTS), Orthogonal Frequency Division Multiplexing (OFDM), etc.

To implement any of the above-described processes 100, 200, memory 50 may store a group application 52 that is executed by processor 60. In addition to providing instructions for implementing conventional group operations, group application 52 also includes instructions for implementing the above-described automatic retransmission processes. These additional instructions include but are not limited to instructions for designating a message as a retransmit group message, evaluating received messages to determine if they are designated as retransmit group messages, and automatically retransmitting group messages designated as retransmit group messages.

Figure 7:
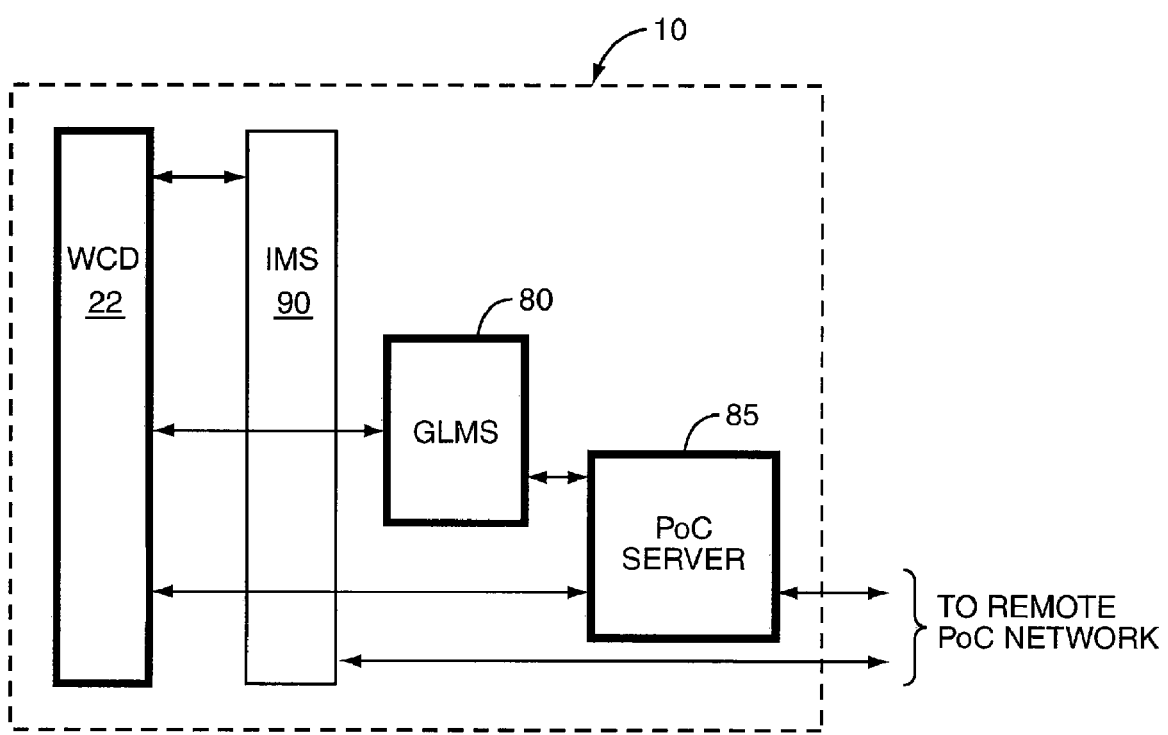
FIG. 7 shows a block diagram illustrating the basic architecture and service elements for PoC services.

PoC represents one exemplary type of group communications, which is further described below with respect to FIG. 7. FIG. 7 illustrates functional elements of an exemplary PoC network 10 as described in the technical specification "Push-to-talk over Cellular (PoC); Architecture; PoC Release 2.0 (V2.0.8)" published jointly by Comneon, Ericsson, Motorola, Nokia, and Siemens, which is incorporated herein by reference. PoC network 10 includes a wireless communication device 22 that interfaces with a Group and List Management Server (GLMS) 80 and PoC Server 85 via an IP Multi-media Subsystem (IMS) 90. The elements shown in bold represent the basic elements of the PoC network 10.

The PoC server 85 is a network entity that provides services needed for PoC functionality, such as SIP session handling, group session handling, access control, floor control functionality, participant identification and media distribution. PoC server 85 is an endpoint for group communications and may function as a participating or controlling PoC server 85. The GLMS 80, also referred to herein as the group server 80, is responsible for managing group lists, contact lists, and access lists associated with each user terminal. A group list is a list of groups 20 to which a device 22 belongs. Each group 20 comprises a collection of device identities defined by a user creating the group 20. The user creating the group 20 is the group owner and may modify or delete the group 20. GLMS 80 assigns each group 20 a group identifier. The contact list managed by GLMS 80 is a kind of address book accessible by devices 22 including addresses for other devices 22 or groups 20.

During an active group session, all devices 22 connect to the same PoC server 85. Once the session is established, PoC server 85 performs floor control and media distribution. Devices 22 request the floor from the PoC server 85, and the PoC server 85 grants it to them one at a time. The device 22 holding the floor generates and sends a group message to the PoC server 85, which distributes the group message to the remaining devices 22 in the group 20. When the group message is designated as a retransmit group message, the retransmitting device 22 retransmits the group message to the PoC server 85, which redistributes the group message to the devices 22 in the next group 20. This process repeats for all retransmitting devices 22 that receive the retransmit group message.

Groups 20 can be ad hoc or persistent. An ad hoc group 20 exists only for the current session and is assigned a temporary group identifier at the time the group PTT session is established. Persistent groups 20 are predefined groups 20 that are stored in the GLMS 80 and have a permanent group identifier. Using persistent groups 20 for instant group PTT session is convenient for users, particularly for large groups 20, since it avoids the need to manually select individual users and/or input individual user addresses. Users may predefine multiple persistent groups 20 and store their predefined groups in the GLMS 80 for use in initiating instant group communication sessions. It will be appreciated that the present invention applies to both ad hoc and persistent groups.

Group list management protocols typically include a method for creating a group. Exemplary group creation procedures are discussed in jointly owned U.S. application Ser. No. 10/993,472 filed 19 Nov. 2004 and published as US2006/0111135 on 25 May 2006, which incorporated herein by reference. In one example, a device 22 may create a new group by sending group request to GLMS 80. A group response from GLMS 80 includes a group identifier (i.e., SIP address). Device 22 sends a join invitation including this group identifier to one or more candidate devices. Candidate devices 22 that accept the invitation to join the group update their group lists to include the received group identifier of the new group. GLMS 80 maintains a list of the devices in each predefined group. Once a group 20 is defined, any member of the group can use the new group 20 to initiate an instant group PTT session. Further, a group owner may invite a new member at any time by sending a join invitation with the group identifier to a new candidate member. If the new candidate member accepts the invitation, the new group member updates their group list with the received group identifier. It will be appreciated that the above-described method for creating a group and adding a new member to a group is included herein for illustrative purposes and should not be construed as limiting.

The above describes the present invention in terms of a top-down hierarchy, where messages generated in group A flow down to wireless communication devices 22 in groups B-E. However, it will be appreciated that any device 22 in any group 20 may generate and transmit a group message. For example a device 22 in group B may generate a group message and transmit the message to the devices 22 in groups A and C-E via the corresponding retransmitting devices 22a, 22b, and 22c. Further, the present invention is not limited to the number of groups 20 or wireless communication devices 22 shown in FIGS. 1 and 4.

In addition, the above describes how a group message may be transmitted to all devices 22 belonging to all of the hierarchically connected groups 20. However, it will be appreciated that the group message may be limited to a predefined number of automatic retransmissions. For example, a device 22 in group A may want to communicate with all devices 22 in groups A and B, but not with the devices 22 in groups C-E. To implement this embodiment, one exemplary process may use a retransmit count included in the message to identify and track the desired number of retransmissions. Each time a retransmitting device 22 receives the group message, the retransmitting device 22 evaluates the retransmit count in the received message. When the retransmit count is non-zero, the device 22 decrements the retransmit count by 1 and retransmits the group message. When the decremented retransmit count in the received message is zero, the receiving device does not retransmit the received message.

To illustrate, consider the following example. Assume device 22 in group A generates a group message that includes a retransmit count of "1" in the group message. When retransmitting device 22a receives the group message, device 22a evaluates the retransmit indicator and the retransmit count. Because the retransmit indicator is set and the retransmit count is non-zero, device 22a decrements the retransmit count and retransmits the group message to the devices 22 in group B. When device 22b receives the group message, the device 22b evaluates the retransmit count in the received message. Because the retransmit count is now set to "0," device 22b does not retransmit the message to devices 22 in any other group 20. It will be appreciated that the above example is for illustrative purposes and therefore, is non-limiting. As such, other processes not expressly described herein that restrict the number of retransmissions also apply to the present invention.

The above describes the invention in terms of a push-to-talk over cellular network. However, it will be appreciated that the present invention applies to any group communications between groups of wireless communication devices.

The present invention is particularly useful for already established hierarchical groups 20. For example, the present invention may enable a "General" to directly communicate with all "soldiers" in different groups 20 at various levels of a military hierarchy. Thus, the present invention has particular applicability to real-life and simulated military situations. Other applicable hierarchies include, but are not limited to family, business, school, and sports related hierarchies.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of implementing group communications between a plurality of wireless communication devices, the method comprising:
   joining a first wireless communication device to a first group;
   joining the first device to a second group;
   receiving a group message from another wireless communication device in the first group at the first device; and
   automatically retransmitting the group message from the first device to one or more wireless communication devices in the second group if a retransmit indicator in the received group message is set.

2. The method of claim 1 further comprising:
   evaluating a retransmit count included in the received group message; and
   automatically retransmitting the group message if the retransmit count is non-zero.

3. A method of implementing group communications between a plurality of wireless communication devices, the method comprising:
   joining a first wireless communication device to a first group comprising one or more additional wireless communication devices, wherein one of the additional wireless communication devices in the first group comprises a second wireless communication device that is further joined to a second group;
   transmitting a group message from the first device to the second device; and
   setting a retransmit indicator in the group message to indicate to the second device to automatically retransmit the group message to one or more wireless communication devices in the second group.

4. The method of claim 3 wherein another one of the additional wireless communication devices in the first group comprises a third device, and wherein the third device is further joined to a third group.

5. The method of claim 4 further comprising transmitting the group message from the first device to the third device for automatic retransmission by the third device to wireless communication devices in the third group.

6. The method of claim 3 wherein transmitting the group message further comprises transmitting the group message to all of the wireless communication devices in the first group.

7. The method of claim 3 further comprising transmitting a non-group message from the first wireless communication device to only the wireless communication devices in the first group.

8. The method of claim 3 further comprising including a retransmit count in the group message to indicate a desired number of retransmissions.

9. A wireless communication device configured to participate in group communications, the wireless communication device comprising:
   a processor configured to join the device to a first group, and further configured to join the device to a second group; and
   a transceiver configured to receive a group message from a second wireless communication device in the first group and further configured to automatically retransmit the received group message to one or more wireless communication devices in the second group when a retransmit indicator in the received group message is set.

10. The wireless communication device of claim 9 wherein the processor is further configured to:
   evaluate a retransmit count included in the received group message; and
   automatically retransmit the group message if the retransmit count is zero.

11. A wireless communication device configured to participate in group communications, the wireless communication device comprising:
   a processor configured to join the device to a first group comprising one or more additional wireless communication devices, wherein one of the additional wireless communication devices in the first group comprises a second wireless communication device that is further joined to a second group; and
   a transceiver configured to transmit a group message to the second device, wherein a retransmit indicator in said group message is set to indicate to the second device to automatically retransmit the group message to one or more wireless communication devices in the second group.

12. The wireless communication device of claim 11 further comprising a control button, wherein the processor sets the retransmit indicator when the control button is position in a first position and wherein the processor does not set the retransmit indicator when the control button is positioned in a second position.

13. The wireless communication device of claim 12 wherein the control button comprises one of a rocker switch and a slide switch.

14. The wireless communication device of claim 11 further comprising two control buttons, wherein the processor sets the retransmit indicator when one of the two control buttons is activated, and wherein the processor does not set the retransmit indicator when the other of the two control buttons is activated.

15. The wireless communication device of claim 11 wherein the group message further includes a retransmit count that indicates the desired number of retransmissions.

* * * * *

UNITED STATES PATENT AND TRADEMARK OFFICE
CERTIFICATE OF CORRECTION

PATENT NO. : 7,606,588 B2  
APPLICATION NO. : 11/470298  
DATED : October 20, 2009  
INVENTOR(S) : Jeffrey Jason Griffin Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 554 days.

Signed and Sealed this

Twelfth Day of October, 2010

David J. Kappos
*Director of the United States Patent and Trademark Office*